(12) United States Patent
Wang et al.

(10) Patent No.: US 11,611,068 B2
(45) Date of Patent: Mar. 21, 2023

(54) CATHODE MATERIAL AND ELECTROCHEMICAL DEVICE COMPRISING THE SAME

(71) Applicant: NINGDE AMPEREX TECHNOLOGY LIMITED, Ningde (CN)

(72) Inventors: Kai Wang, Ningde (CN); Tao Li, Ningde (CN); Meng Wang, Ningde (CN); Pengwei Chen, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 168 days.

(21) Appl. No.: 16/652,405

(22) PCT Filed: Mar. 17, 2020

(86) PCT No.: PCT/CN2020/079681
§ 371 (c)(1),
(2) Date: Mar. 30, 2020

(87) PCT Pub. No.: WO2020/187201
PCT Pub. Date: Sep. 24, 2020

(65) Prior Publication Data
US 2021/0234154 A1 Jul. 29, 2021

(30) Foreign Application Priority Data
Mar. 19, 2019 (CN) .......................... 201910208868.3

(51) Int. Cl.
*H01M 4/36* (2006.01)
*H01M 4/52* (2010.01)
(Continued)

(52) U.S. Cl.
CPC .......... *H01M 4/364* (2013.01); *H01M 4/131* (2013.01); *H01M 4/523* (2013.01); *H01M 4/525* (2013.01);
(Continued)

(58) Field of Classification Search
None
See application file for complete search history.

(56) References Cited

U.S. PATENT DOCUMENTS 6,617,073 B1 * 9/2003 Matsumoto ........... H01M 4/525
429/231.95
9,093,708 B2 7/2015 Oki
(Continued)

FOREIGN PATENT DOCUMENTS

| CN | 1186267 C | 1/2005 |
|---|---|---|
| CN | 1189396 C | 2/2005 |

(Continued)

OTHER PUBLICATIONS

Machine Translation of JP 11016573A (Year: 1999).*
(Continued)

*Primary Examiner* — Gregg Cantelmo
(74) *Attorney, Agent, or Firm* — Juan Carlos A. Marquez; Marquez IP Law Office, PLLC (57) ABSTRACT

The present application relates to a cathode material and an electrochemical device comprising the same. In particular, the present application relates to a cathode material having a surface heterophasic structure, wherein the cathode material includes a lithium cobalt oxide and an oxide of cobalt, wherein a Raman spectrum of the cathode material has characteristic peaks in the range of about 470 $cm^{-1}$ to about 530 $cm^{-1}$, about 560 $cm^{-1}$ to about 630 $cm^{-1}$ and about 650 $cm^{-1}$ to about 750 $cm^{-1}$, and wherein the surface heterophasic structure of the cathode material includes the lithium (Continued)

cobalt oxide and the oxide of cobalt. The electrochemical device using the cathode material having a surface heterophasic structure of the present application can exhibit excellent cycle performance and thermal stability.

14 Claims, 3 Drawing Sheets

(51) Int. Cl.
   *H01M 4/525* (2010.01)
   *H01M 10/0525* (2010.01)
   *H01M 4/131* (2010.01)
   *H01M 4/02* (2006.01)

(52) U.S. Cl.
   CPC .. *H01M 10/0525* (2013.01); *H01M 2004/028* (2013.01)

(56) References Cited

U.S. PATENT DOCUMENTS

| | | | | |
|---|---|---|---|---|
| 2002/0119371 | A1* | 8/2002 | Haug | H01M 4/13 429/231.95 |
| 2002/0127175 | A1* | 9/2002 | Gao | H01M 10/052 423/594.6 |
| 2005/0019662 | A1* | 1/2005 | Suhara | C01G 51/42 429/231.95 |
| 2006/0063070 | A1 | 3/2006 | Chiga et al. | |
| 2007/0148550 | A1* | 6/2007 | Hasegawa | H01M 4/134 429/231.95 |
| 2017/0187035 | A1 | 6/2017 | Yanaghara et al. | |

FOREIGN PATENT DOCUMENTS

| | | | | |
|---|---|---|---|---|
| CN | 100483806 | C | | 4/2009 |
| CN | 102379049 | A | | 3/2012 |
| CN | 106663794 | A | | 5/2017 |
| CN | 106797028 | A | | 5/2017 |
| CN | 109256531 | A | | 1/2019 |
| CN | 109326781 | A | | 2/2019 |
| CN | 109994729 | A | | 7/2019 |
| JP | 11016573 | A | * | 1/1999 |
| JP | 2006261132 | A | | 9/2006 |
| JP | 2009129721 | | | 6/2009 |
| JP | 2011082133 | A | | 4/2011 |
| JP | 2017536648 | A | | 12/2017 |
| KR | 20160040118 | A | * | 4/2012 ......... H01M 10/052 |
| KR | 20190121436 | A | * | 10/2019 |
| WO | 2010090185 | A1 | | 8/2010 |

OTHER PUBLICATIONS

Machine Translation of KR 20190121436A (Year: 2019).*
PCT International Search Report dated Jun. 10, 2020, in counterpart PCT application PCT/CN2020/079681, 4 pages.
Chinese First Office Action dated May 8, 2020 in counterpart Chinese application 201910208868.3, 20 pages.
"Raman Imaging Analysis of Local Crystal Structures in LiCoO2 Thin Films Calcined at Different Temperatures," Hara et al., Analytical Sciences, Jul. 2017, vol. 33, pp. 853-858.
"High-Performance, Layered, 3D-LiCoO2 Cathodes with a Nanoscale Co3O4 Coating via Chemical Etching," Jeong et al., Advanced Energy Materials, 2011, 1, pp. 368-372.
Japanese First Office Action dated Oct. 11, 2022 in counterpart Japanese application JP2021555287, 2 pages in Japanese.
Extended European Search Report dated Nov. 28, 2022 in counterpart European application EP 20712427.2, 6 pages.
"LiCoO2 and LiCo1-xAlxO2 thin film cathodes grown by pulsed laser ablation," Perkins et al., Journal of Power Sources 81-82 (1999), pp. 675-679.
"Syntheses of LiCoO2 for cathode materials of secondary batteries from reflux reactions at 130-200°C.," Chang et al., Journal of Power Sources 104 (2002), pp. 125-131.

* cited by examiner

CATHODE MATERIAL AND ELECTROCHEMICAL DEVICE COMPRISING THE SAME

CROSS REFERENCE TO RELATED APPLICATIONS

The present application is a National Stage application of PCT international application: PCT/CN2020/079681 which claims the benefit of priority from the China Patent Application No. 201910208868.3, filed on 19 Mar. 2019, the disclosure of which is hereby incorporated by reference in its entirety.

BACKGROUND

1. Technical Field

The present application relates to the field of energy storage, and in particular to, a cathode material and an electrochemical device using the cathode material.

2. Description of the Related Art

With the popularity of consumer electronic products such as notebook computers, mobile phones, handheld game consoles, tablet computers, mobile power supplies and drones, requirements for electrochemical devices (for example, batteries) have become ever more stringent. For example, people require not only light weight but also high capacity and long service life of the batteries. Among the numerous batteries on the market, lithium-ion batteries have occupied an established position due to their outstanding advantages, such as high energy density, notable safety, low self-discharge, no memory effect, and long service life.

SUMMARY

The present application provides a cathode material, a cathode including the cathode material, a method for preparing the cathode material and an electrochemical device using the cathode in an attempt to resolve at least one of the problems that exist in the related art to some extent.

In one embodiment, the present application provides a cathode material, including a lithium cobalt oxide and an oxide of cobalt, wherein a Raman spectrum of the cathode material has characteristic peaks in the range of about 470 $cm^{-1}$ to about 530 $cm^{-1}$, about 560 $cm^{-1}$ to about 630 $cm^{-1}$ and about 650 $cm^{-1}$ to about 750 $cm^{-1}$, wherein the cathode material has a surface heterophasic structure, and wherein the surface heterophasic structure includes the lithium cobalt oxide and the oxide of cobalt.

In some embodiments, the surface heterophasic structure is present in a bulk phase of about D nm of the cathode material ranging from the surface to the interior of the cathode material, wherein the range of D is about 0≤D≤ about 300.

In some embodiments, the oxide of cobalt includes one or more of the following: $Co_3O_4$, $Co_2O_3$ or $CoO$.

In some embodiments, the peak intensity at the characteristic peak of about 650 $cm^{-1}$ to about 750 $cm^{-1}$ in the Raman spectrum of the cathode material is $I_1$, the peak intensity at the characteristic peak of about 470 $cm^{-1}$ to about 530 $cm^{-1}$ is 12, and the peak intensity at the characteristic peak of about 560 $cm^{-1}$ to about 630 $cm^{-1}$ is 13, wherein about $0<I_1/I_3\le$ about 1, and about $0<I_1/I_2\le$ about 1.

In some embodiments, the molecular formula of the cathode material is $Li_xCo_{1-a}O_{2-b}\cdot yCoO\cdot zCo_2O_3\cdot M_aG_b$, wherein 0.8≤x≤1.05, 0<y≤z<0.2, 0≤a≤0.01, and 0≤b≤0.01, wherein the element M includes one or more of the following: Al, Mg, Ca, Zn, Ti, Zr, Nb, Mo, La, Y, Ce, Ni, Mn, W or Ho, wherein the element G includes one or more of the following: F, S, B, N or P.

In another embodiment, the present application provides a cathode, including the cathode material according to the above embodiments.

In some embodiments, the Raman spectrum of the cathode has characteristic peaks in the range of about 470 $cm^{-1}$ to about 530 $cm^{-1}$, about 560 $cm^{-1}$ to about 630 $cm^{-1}$ and about 650 $cm^{-1}$ to about 750 $cm^{-1}$.

In another embodiment, the present application provides an electrochemical device, including an anode, a separator, an electrolyte and the cathode according to the above embodiments.

In some embodiments, the electrochemical device is a lithium-ion battery.

In another embodiment, the present application provides a method for preparing the cathode material according to the above embodiments, including: performing one of the following: mixing a lithium source and a cobalt source, mixing a lithium source, a cobalt source and an M source, mixing a lithium source, a cobalt source and a G source, or mixing a lithium source, a cobalt source, an M source and a G source, wherein the molar ratio of lithium to cobalt in the mixed material is about 0.9-1.05, wherein the element M includes one or more of the following: Al, Mg, Ca, Zn, Ti, Zr, Nb, Mo, La, Y, Ce, Ni, Mn, W or Ho, and the element G includes one or more of the following: F, S, B, N or P; sintering the mixed material at about 600-1000° C. for about 15-40 h; and grinding the sintered material.

In some embodiments, the preparation method further includes mixing the ground material with an M source or a G source, and sintering the mixed substances at about 250-1000° C. for about 2-15 h.

In another embodiment, the present application provides an electronic device, including the electrochemical device according to the above embodiments.

Additional aspects and advantages of the embodiments of the present application will be described or shown in the following description or interpreted by implementing the embodiments of the present application.

BRIEF DESCRIPTION OF THE DRAWINGS

The following will briefly illustrate the accompanying drawings necessary to describe the embodiments of the present application or the prior art so as to facilitate the description of the embodiments of the present application. Obviously, the accompanying drawings described below are only part of the embodiments of the present application. For those skilled in the art, the accompanying drawings of other embodiments can still be obtained according to the structures illustrated in the accompanying drawings without any creative effort.

PREFERRED EMBODIMENT OF THE PRESENT APPLICATION

Embodiments of the present application are described in detail below. Throughout the specification, the same or similar components and components having the same or similar functions are denoted by similar reference numerals. The embodiments described herein with respect to the accompanying drawings are illustrative and graphical, and are used for providing a basic understanding on the present application. The embodiments of the present application should not be construed as limiting the present application.

As used herein, the terms "approximately," "substantially," "essentially," and "about" are used to describe and illustrate minor changes. When being used in combination with an event or circumstance, the term may refer to an example in which the event or circumstance occurs precisely, and an example in which the event or circumstance occurs approximately. For example, when being used in combination with a value, the term may refer to a variation range of less than or equal to ±10% of the value, for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, if the difference value between the two values is less than or equal to ±10% of the average of the values (for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%), then the two values can be considered "substantially" the same.

In this specification, unless otherwise specified or limited, the relative terms such as "central," "longitudinal," "lateral," "front," "rear," "right," "left," "internal," "external," "lower," "higher," "horizontal," "vertical," "higher than," "lower than," "above," "below," "top," "bottom," and their derivatives (e.g. "horizontally," "downward" and "upward") should be interpreted as referring to the directions described in the discussion or in the drawings. These relative terms are used for convenience only in the description and are not required to construct or operate the present application in a particular direction.

In addition, amounts, ratios and other numerical values are sometimes presented herein in a range format. It should be appreciated that such range formats are for convenience and conciseness, and should be flexibly understood as comprising not only values explicitly specified to range constraints, but also all individual values or sub-ranges within the ranges, like explicitly specifying each value and each sub-range.

In the detailed description and claims, a list of items connected by the term "one or more of" or other similar terms may mean any combination of the listed items. For example, if items A and B are listed, then the phrase "at least one of A and B" means only A; only B; or A and B. In another example, if items A, B and C are listed, then the phrase "at least one of A, B and C" means only A; or only B; only C; A and B (excluding C); A and C (excluding B); B and C (excluding A); or all of A, B and C. The item A may include a single component or multiple components. The item B may include a single component or multiple components. The item C may include a single component or multiple components.

The term "heterophasic structure" refers to a polycrystalline phase formation of a localized region, that is, two or more different substances, or substances of two or more different crystalline phases are simultaneously contained in a specific region.

The term "surface heterophasic structure" means that two or more different substances, or substances of two or more different crystalline phases are simultaneously contained in a surface region. In some embodiments, the "surface heterophasic structure" as used herein means that lithium cobalt oxide and an oxide of cobalt are simultaneously contained in the surface region of the cathode material, while two phases coexist and have a common grain boundary in a partial region.

The term "lithium cobalt oxide" refers to lithium cobaltate and/or doping-modified lithium cobaltate. The lithium cobalt oxide may be represented by the general formula $LiCo_{1-a}O_{2-b}·M_aG_b$, wherein $0 \leq a \leq 0.2$, and $0 \leq b \leq 0.2$, and wherein the element M is at least one metal element, and the element G is at least one non-metal element. In some embodiments, the element M includes, but is not limited to, one or more of the following: Al, Mg, Ca, Zn, Ti, Zr, Nb, Mo, La, Y, Ce, Ni, Mn, W or Ho. In some embodiments, the element G includes, but is not limited to, one or more of the following: F, S, B, N or P.

I. Cathode Material

Currently, there are numerous cathode materials for lithium-ion batteries, and among these numerous cathode materials, lithium cobaltate ($LiCoO_2$) has become a common battery material in the field of electronic products due to its high discharge voltage platform and high volumetric energy density. The discharge capacity per gram of lithium cobaltate increases with the increase of the operating voltage. Generally, for every 0.1 V increase in operating voltage, the discharge capacity per gram of lithium cobaltate can be increased by about 10%. Due to the pursuit of high energy density, a charge cut-off voltage of lithium cobaltate has been increasing, from 4.2 V, 4.3 V to today's 4.4 V. However, when the lithium-ion battery is charged to 4.4 V or above, there will be more lithium ions deintercalating from the lithium cobaltate, which may cause the lithium cobaltate to irreversibly transform from the hexagonal system to the monoclinic system, thereby losing the function of reversible intercalation and deintercalation of lithium ions. At the same time, the above process is accompanied by the dissolution of cobalt ions in the electrolyte. That is, the lithium-ion battery may undergo irreversible phase change and structural collapse under a high-voltage charging and discharging environment, resulting in destruction of its own layered structure. In addition, the lithium cobaltate cathode material will contact and react with the electrolyte, which will damage the surface of the particles and produce gas, thereby affecting the safety performance of the battery and damaging the service life of the battery.

In order to improve the cycle stability and safety performance of lithium cobaltate at high voltage, the prior art usually uses doping or surface coating to modify the lithium cobaltate. For example, the prior art generally introduces other metal elements to replace the cobalt element sites in the lithium cobaltate or introduces other non-metal elements to replace the oxygen element sites in the lithium cobaltate to stabilize the body structure of the lithium cobaltate. For another example, the prior art also forms a stable coating layer on a surface of the synthesized lithium cobaltate for reducing or isolating side reactions between the lithium cobaltate and the electrolyte, and prolonging the cycle life of the material. However, the above-mentioned improvement means requires a cumbersome operation process, increases production costs, and is unfavorable for industrial production.

In addition, the prior art generally uses a higher lithium to cobalt ratio (for example, the molar ratio of Li:Co is 1.08-1.1) to synthesize lithium-ion-rich lithium cobaltate. In other words, those skilled in the art will expect a surplus of lithium in the synthesized lithium cobaltate. In this way, during a first charge and discharge process, excess lithium ions in the cathode material are preferentially consumed to form a layer of SEI film on the surface of the lithium cobaltate. Thus, it will not reduce the amount of lithium ions which can actually participate in the electrochemical reaction in the cathode material, so that the discharge capacity of the cathode material and the energy density of the lithium-ion battery are not lowered. However, the present application notes that when the content of lithium in lithium cobaltate is too high, lithium disorder is caused. That is, excess lithium is distributed in the lithium cobaltate in a disordered state. For example, excess lithium may be located between Li—Co or Co—O, or the excess lithium may crowd adjacent tetrahedral sites or sites of Co, which causes structural confusion and reduces the structural stability of the material.

Based at least on the above prior art, the present application synthesizes a cathode material having a surface heterophasic structure by using a lower lithium to cobalt ratio (e.g., the molar ratio of Li:Co is about 0.9-1.05) and a special preparation process. Specifically, the cathode material includes lithium cobalt oxide and an oxide of cobalt, wherein a Raman spectrum of the cathode material has characteristic peaks in the range of about 470 cm$^{-1}$ to about 530 cm$^{-1}$, about 560 cm$^{-1}$ to about 630 cm$^{-1}$ and about 650 cm$^{-1}$ to about 750 cm$^{-1}$, the cathode material having a surface heterophasic structure, and the surface heterophasic structure including the lithium cobalt oxide and the oxide of cobalt.

According to some embodiments of the present application, the oxide of cobalt includes, but is not limited to, one or more of the following: $Co_3O_4$, $Co_2O_3$ or $CoO$.

The present application uses Raman spectrum to characterize the structure of the cathode material, wherein the characteristic peaks of the Raman spectrum in the ranges of about 470 cm$^{-1}$ to about 530 cm$^{-1}$ and about 560 cm$^{-1}$ to about 630 cm$^{-1}$ are the characteristic peaks of the lithium cobalt oxide, and the characteristic peak in the range of about 650 cm$^{-1}$ to about 750 cm$^{-1}$ is the characteristic peak of the oxide of cobalt.

According to some embodiments of the present application, the cathode material has a low lithium to cobalt ratio. In some embodiments, the molar ratio of Li:Co in the synthesized cathode material is about 0.6 to about 1.05. When the molar ratio of Li:Co in the synthesized cathode material is any point value within the range or any sub-range within the range, it is within the scope of the present application. For example, the molar ratio of Li:Co in the synthesized cathode material may be, but is not limited to, any of about 0.62, about 0.65, about 0.7, about 0.72, about 0.75, about 0.8, about 0.82, about 0.85, about 0.87, about 0.9, about 0.95, about 0.97, about 1.0, about 1.02 or about 1.05. For another example, the molar ratio of Li:Co in the synthesized cathode material may be, but is not limited to, any of the following ranges: about 0.61 to about 1.05, about 0.63 to about 1.05, about 0.64 to about 1.05, about 0.66 to about 1.05, about 0.7 to about 1.05, about 0.71 to about 1.05, about 0.73 to about 1.05, about 0.74 to about 1.05, about 0.76 to about 1.05, about 0.8 to about 1.05, about 0.81 to about 1.05, about 0.83 to about 1.05, about 0.84 to about 1.05, about 0.86 to about 1.05, about 0.9 to about 1.05, about 0.93 to about 1.05, about 0.94 to about 1.05, about 0.96 to about 1.05, about 0.6 to about 1.04, about 0.6 to about 1.03, about 0.6 to about 0.98, about 0.6 to about 0.96, about 0.7 to about 0.94, about 0.7 to about 0.93, about 0.8 to about 0.88, about 0.8 to about 0.86, about 0.8 to about 0.84, and about 0.8 to about 0.83.

According to some embodiments of the present application, the surface heterophasic structure is present in a bulk phase of about D nm of the cathode material ranging from the surface to the interior of the cathode material, wherein the range of D is about 0<D≤about 300. According to some embodiments of the present application, the range of D is about 0<D≤about 200. The depth of the surface heterophasic structure (i.e., the value of D) is adjusted by the manufacturing process. For example, different Li:Co molar ratios, temperatures for high-temperature treatment and duration for high-temperature treatment all affect the depth of the surface heterophasic structure.

According to some embodiments of the present application, the peak intensity at the characteristic peak of about 650 cm$^{-1}$ to about 750 cm$^{-1}$ in the Raman spectrum of the cathode material is $I_1$, the peak intensity at the characteristic peak of about 470 cm$^{-1}$ to about 530 cm$^{-1}$ is $I_2$, and the peak intensity at the characteristic peak of about 560 cm$^{-1}$ to about 630 cm$^{-1}$ is $I_3$, wherein $0<I_1/I_3\leq 1$, and $0<I_1/I_2\leq 1$. According to some embodiments of the present application, the relations of the peak intensities $I_1$, $I_2$ and $I_3$ of the above characteristic peaks are: about $0.1\leq I_1/I_3\leq$ about 0.6, about $0.1\leq I_1/I_2\leq$ about 0.6.

According to some embodiments of the present application, the molecular formula of the cathode material is $Li_xCo_{1-a}O_{2-b}\cdot yCoO\cdot zCo_2O_3\cdot M_aG_b$, wherein $0.8\leq x\leq 1.05$, $0<y\leq z<0.2$, $0\leq a\leq 0.01$, and $0\leq b\leq 0.01$, wherein the element M includes, but is not limited to, one or more of the following: Al, Mg, Ca, Zn, Ti, Zr, Nb, Mo, La, Y, Ce, Ni, Mn, W or Ho, wherein the element G includes, but is not limited to, one or more of the following: F, S, B, N or P. According to some embodiments of the present application, in the above molecular formula, the range of x is about $0.8\leq x\leq 1.0$.

It should be noted that in the molecular formula $Li_xCo_{1-a}O_{2-b}\cdot yCoO\cdot zCo_2O_3\cdot M_aG_b$, the element M and/or the element G may be introduced into the cathode material by doping and/or coating. In some embodiments, the element M and/or element G may be doped into lithium cobaltate during the synthesis of lithium cobaltate, and the cathode material exists in the form of "$Li_xCo_{1-a}M_aO_{2-b}G_b\cdot yCoO\cdot zCo_2O_3$." In some embodiments, the synthesized $LiCoO_2\cdot yCoO\cdot zCo_2O_3$ may be coated with a compound of the element M and/or the element G to obtain a cathode material $Li_xCo_{1-a}O_{2-b}\cdot yCoO\cdot zCo_2O_3\cdot M_aG_b$. In some embodiments, the cathode material $Li_xCo_{1-a}O_{2-b}\cdot yCoO\cdot zCo_2O_3\cdot M_aG_b$ can be obtained by doping and coating simultaneously.

The present application is not particularly limited to the average particle diameter and specific surface area of the cathode material. The "average particle diameter" herein refers to the median particle diameter $Dv_{50}$, which is the particle diameter value of the cathode material particles at 50% in the cumulative distribution curve (the cumulative distribution curve shows the granularity of the smallest particle to the largest particle). When the median particle diameter $Dv_{50}$ is too small, the cathode material particles may excessively react with the electrolyte, resulting in deterioration of the cycle stability and rate performance. However, when the median particle diameter $Dv_{50}$ is too large, the active specific surface area of the cathode material particles will decrease, and the active sites for participating in the electrochemical reaction will be reduced, making it difficult to achieve high energy density. In some embodiments of the present application, the median particle diameter $Dv_{50}$ of the cathode material is in the range of about 4 μm to about 30 μm. In some embodiments of the present application, the median particle diameter $Dv_{50}$ of the cathode material is in the range of about 8 μm to about 18 μm.

The specific surface area of the cathode material is related to its average particle diameter. For example, as the average particle diameter of the cathode material is smaller, the specific surface area thereof will be larger; and as the average particle diameter of the cathode material is larger, the specific surface area thereof will be smaller. In some embodiments of the present application, the specific surface area of the coated cathode material is in the range of about 0.08-0.4 $m^2$/g. In some embodiments of the present application, the specific surface area of the coated cathode material is in the range of about 0.1-0.3 $m^2$/g.

The cathode material having a surface heterophasic structure according to the present application has at least the following characteristics:

1. The heterophasic structure formed by the lithium cobalt oxide and the oxide of cobalt is mainly distributed on the surface of the cathode material, that is, the surface of the cathode material has a low lithium to cobalt ratio, so that the surface of the cathode material does not have a disordered structure formed due to an excess of lithium; in other words, the surface of the cathode material is in a lithium ion ordered state, which effectively reduces the surface energy of the cathode material and enhances the surface stability of the cathode material;

2. The cathode material is a polycrystalline phase material capable of withstanding more structural stress, thereby effectively reducing the cracking of the material particles caused by the large expansion and contraction of the cathode material during the intercalation and deintercalation of lithium ions;

3. The surface heterophasic structure of the present application does not affect the stability of body structure of the lithium cobalt oxide; at the same time, the surface heterophasic structure does not affect channels of the lithium cobalt oxide itself for intercalating and deintercalating lithium ions; therefore, the surface heterophasic structure does not affect the kinetic performance of the lithium cobalt oxide.

Based on the above characteristics of the cathode material of the present application, the cathode material has excellent structural stability. When the cathode material of the present application is applied to an electrochemical device (for example, a lithium-ion battery), the electrochemical device can exhibit excellent electrochemical performance, especially good cycle performance.

II. Cathode

The embodiments of the present application further provide a cathode, including a cathode active material layer and a current collector, wherein a cathode active material layer is located on at least one surface of the current collector, and the cathode active material layer includes the cathode material of the present application. In some embodiments of the present application, the current collector can be, but is not limited to, aluminum foil or nickel foil.

Figure 1:
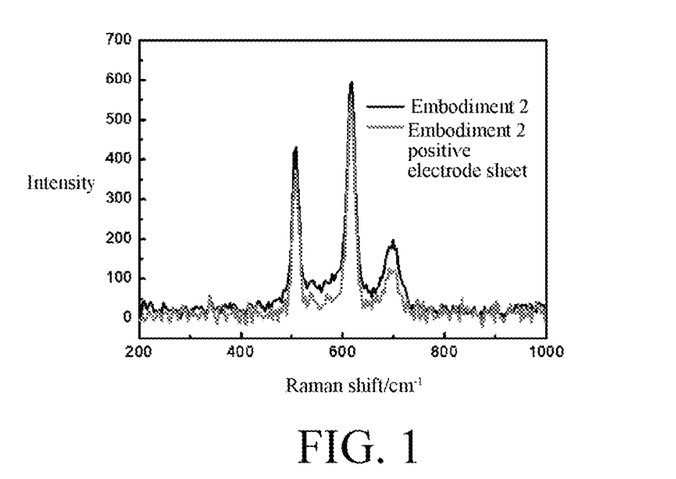
FIG. 1 respectively shows a Raman spectrum of a cathode material of Embodiment 2 and a cathode prepared from the cathode material of Embodiment 2.

It should be noted that a structure of the cathode material of the present application is very stable. For example, FIG. 1 respectively shows a Raman spectrum of a cathode material of Embodiment 2 and a cathode prepared from the cathode material of Embodiment 2. It can be seen from FIG. 1 that, like the Raman spectrum of the cathode material, the Raman spectrum of the cathode still has characteristic peaks in the ranges of about 470 $cm^{-1}$ to about 530 $cm^{-1}$, about 560 $cm^{-1}$ to about 630 $cm^{-1}$ and about 650 $cm^{-1}$ to about 750 $cm^{-1}$. This shows that in the process of applying the cathode material to the current collector to prepare a cathode, the structure of the cathode material remained good without being damaged.

In some embodiments of the present application, the cathode active material layer further includes a binder and/or a conductive agent. In some embodiments, the binder can be one or more of polyvinylidene fluoride, a vinylidene fluoride-hexafluoropropylene copolymer, polyamide, polyacrylonitrile, polyacrylate ester, polyacrylic acid, polyacrylate salt, sodium carboxymethyl cellulose, polyvinylpyrrolidone, polyvinyl ether, polymethyl methacrylate, polytetrafluoroethylene, polyhexafluoropropylene, styrene-butadiene rubber and epoxy resin. In some embodiments, the conductive agent can be one or more of conductive carbon black, carbon fibers, Ketjen black, acetylene black, carbon nanotubes and graphene.

In some embodiments of the present application, the cathode further includes an undercoat layer between the cathode active material layer and the current collector. In some embodiments, the undercoat layer includes one or more of conductive carbon black, carbon fibers, Ketjen black, acetylene black, carbon nanotubes and graphene.

The main function of the undercoat layer is to conduct and bond, and the appropriate thickness of the undercoat layer promotes better kinetic effects of the cathode active material. In some embodiments of the present application, the ratio of the thickness of the undercoat layer to the thickness of the cathode active material layer is about 1:20-1:200. In some embodiments of the present application, the ratio of the thickness of the undercoat layer to the thickness of the cathode active material layer is about 1:40-1:150. In some embodiments of the present application, the ratio of the thickness of the undercoat layer to the thickness of the cathode active material layer is about 1:60-1:120.

The compaction density of the electrode also affects the electrochemical performance of the electrochemical device. In some embodiments of the present application, the compaction density of the cathode is about 1.00-2.00 g/cc. In some embodiments, the compaction density of the cathode is about 1.30-1.85 g/cc. In some embodiments, the compaction density of the cathode is about 1.30-1.80 g/cc. In some embodiments, the compaction density of the cathode is about 1.30-1.70 g/cc. In some embodiments, the compaction density of the cathode is about 1.41-1.80 g/cc. In some embodiments, the compaction density of the cathode is about 1.41-1.70 g/cc.

III. Preparation Method of Cathode Material

Embodiments of the present application further provide a method for preparing the cathode material of the present application. Specifically, the present application synthesizes the cathode material having a surface heterophasic structure of the present application by adjusting parameters such as the molar ratio of Li to Co in raw materials, a sintering (high-temperature treatment) temperature, and a sintering (high-temperature treatment) duration.

Specifically, the method for preparing a cathode material of the present application may include the following steps:

mixing a lithium source and a cobalt source, wherein the molar ratio of Li to Co in the mixed material is about 0.9-1.05;

sintering the mixed material at about 600-1000° C. for about 15-40 h; and grinding the sintered material.

In some embodiments of the present application, the mixing may be performed using, but is not limited to, any one of a ball mill mixer, a V-type mixer, a three-dimensional mixer, a gas flow mixer and a horizontal mixer.

In some embodiments of the present application, the sintering atmosphere is an air atmosphere or an inert atmosphere. The inert gas may be, but is not limited to, at least one of helium, argon and nitrogen.

In some embodiments, the mixed material is sintered at about 650-950° C. In some embodiments, the mixed material is sintered at about 700-900° C. In some embodiments, the mixed material is sintered at about 750-850° C. In some embodiments, the mixed material is sintered at about 700° C., at about 800° C. or at about 900° C.

In some embodiments, the mixed material is sintered at high temperature for about 20-35 h. In some embodiments, the mixed material is sintered at high temperature for about 20-30 h. In some embodiments, the mixed material is sintered at high temperature for about 20-28 h.

In some embodiments, the mixed material is sintered at high temperature at a heating rate of about 1-20° C./min. In some embodiments, the mixed material is sintered at high temperature at a heating rate of about 2-15° C./min. In some embodiments, the mixed material is sintered at high temperature at a heating rate of about 2-10° C./min.

In some embodiments, the sintering may use, but is not limited to, any one of a tube furnace, a box furnace and a rotary kiln for high temperature heating.

In some embodiments, the above preparation method further includes sieving the ground material. The standard for sieving is about 100-2500 mesh.

In some embodiments of the present application, the doping element M and/or element G may be introduced into lithium cobaltate during the synthesis of lithium cobaltate to obtain a doped cathode material $Li_xCo_{1-a}O_{2-b}.yCoO.zCo_2O_3.M_aG_b$ having a surface heterophasic structure. For example, the doped cathode material can be prepared, but is not limited to, by using one of the following two methods:

first, in the mixing step, the above-mentioned "mixing a lithium source and a cobalt source" is replaced by one of "mixing a lithium source, a cobalt source and an M source," "mixing a lithium source, a cobalt source and a G source" or "mixing a lithium source, a cobalt source, an M source and a G source";

second, the raw material cobalt source used is a cobalt source doped with element M, a cobalt source doped with element G or a cobalt source doped with elements M and G at the same time.

In some embodiments of the present application, the synthesized $LiCoO_2.yCoO.zCo_2O_3$ may be coated with a compound of the element M and/or the element G to obtain a cathode material $Li_xCo_{1-a}O_{2-b}.yCoO.zCo_2O_3.M_aG_b$. For example, the coated cathode material can be prepared, but is not limited to, by using the following method: continuing mixing the ground material $LiCoO_2.yCoO.zCo_2O_3$ with the M source and/or the G source thoroughly, and performing high-temperature treatment on the uniformly mixed material.

In some embodiments of the present application, the cathode material $Li_xCo_{1-a}O_{2-b}.yCoO.zCo_2O_3.M_aG_b$ can be obtained by doping and coating simultaneously.

In some embodiments, during the process of coating treatment, the temperature of the high-temperature treatment is about 250-1000° C., and the duration of the high-temperature treatment is about 2-15 h. In some embodiments, during the process of coating treatment, the atmosphere of the high-temperature treatment is an air atmosphere or an inert atmosphere, wherein the inert gas may be, but is not limited to, at least one of helium, argon and nitrogen. In some embodiments, the above preparation method further includes grinding and sieving the material subjected to high-temperature treatment, the standard for sieving being about 100-2500 mesh.

The above-mentioned element M is a metal element. The element M includes, but is not limited to, one or more of the following: Al, Mg, Ca, Zn, Ti, Zr, Nb, Mo, La, Y, Ce, Ni, Mn, W or Ho. The above-mentioned G is a non-metal element. The element G includes, but is not limited to, one or more of the following: F, S, B, N or P.

The types of the lithium source, the cobalt source, the M source, and the G source are not particularly limited as long as they are substances that can effectively provide the lithium element, cobalt element, M element and G element, and those skilled in the art can flexibly select according to actual needs. In some embodiments of the present application, the lithium source may be, but is not limited to, one or more of lithium hydroxide, lithium carbonate, lithium acetate, lithium oxalate, lithium oxide, lithium chloride, lithium sulfate and lithium nitrate. In some embodiments of the present application, the cobalt source may be, but is not limited to, one or more of cobalt hydroxide, cobalt carbonate, cobalt acetate, cobalt oxalate, cobalt oxide, cobalt chloride, cobalt sulfate and cobalt nitrate. In some embodiments of the present application, the M source may be, but is not limited to, one or more of the nitrates, hydroxides, oxides, peroxides, sulfates and carbonates of the element M. The G source may be, but is not limited to, one or more of nitrates, hydroxides, oxides, peroxides, sulfates and carbonates of the element G. The elements denoted by the elements M and G are consistent with the previous description, and will not be further described herein.

The preparation method provided by the embodiments of the present application has the following characteristics and advantages:

Firstly, the present application can form a cathode material having a surface heterophasic structure by a single sintering process by using a lower lithium to cobalt ratio and a suitable sintering temperature and sintering duration. The reason is that lithium ions diffuse and permeate into the oxide of cobalt slowly during the synthesis process, and by controlling the sintering temperature and the sintering duration, lithium ions can sufficiently permeate into the interior of the oxide of cobalt; and since the lithium ions are not excessive, this makes it difficult to completely consume the oxide of cobalt on the surface layer, thereby obtaining a heterophasic structure in which the surface layer is simultaneously distributed with the oxide of cobalt and the lithium cobalt oxide. In addition, proper sintering temperature and sintering duration can optimize the lattice distribution of the obtained cathode material and reduce the surface energy of the cathode material.

Secondly, the preparation method is simple and easy to operate, controllable in reaction conditions and very suitable for industrial production, and has broad commercial application prospects. For example, the preparation method can obtain a cathode material having excellent electrochemical performance by a single sintering process, instead of multiple sintering processes.

IV. Electrochemical Device

Embodiments of the present application further provide an electrochemical device using the cathode material of the present application. In some embodiments, the electrochemical device includes an anode containing an anode material, a cathode containing the cathode material of the present application, a separator and an electrolyte. The cathode of the present application includes a cathode active material layer formed on the surface of a cathode current collector, wherein the cathode active material layer includes the cathode material of the present application. In some embodiments, the electrochemical device is a lithium-ion battery. In some embodiments of the present application, the cathode current collector may be, but is not limited to, aluminum foil or nickel foil, and the anode current collector may be, but is not limited to, copper foil or nickel foil.

The anode includes an anode material capable of absorbing and releasing lithium (Li) (hereinafter, sometimes referred to as "an anode material capable of absorbing/releasing lithium (Li)"). Examples of the anode material capable of absorbing/releasing lithium (Li) may include, but is not limited to, carbon materials, metal compounds, oxides, sulfides, nitrides of lithium such as $LiN_3$, lithium metal, metals forming alloys together with lithium, and polymer materials.

The carbon material may include, but is not limited to, low graphitized carbon, easily graphitized carbon, artificial graphite, natural graphite, mesocarbon microbeads, soft carbon, hard carbon, pyrolytic carbon, coke, vitreous carbon, an organic polymer-compound sintered body, carbon fiber and activated carbon. The coke may include pitch coke, needle coke and petroleum coke. The organic polymer-compound sintered body refers to a material obtained by calcining a polymer material (for example, phenol plastic or furan resin) at a suitable temperature and carbonizing the same. These materials can be classified into low graphitized carbon or easily graphitized carbon. The polymer material may include, but is not limited to, polyacetylene and polypyrrole.

Among these anode materials capable of absorbing/releasing lithium (Li), further, a material whose charge and discharge voltages are close to the charge and discharge voltages of lithium metal is selected. This is because if the charge and discharge voltages of the anode material are lower, the lithium-ion battery has higher energy density more easily. The anode material can be selected from carbon materials because their crystal structures are only slightly changed upon charging and discharging, so good cycle characteristics and large charging and discharging capacities can be obtained. In particular, graphite may be selected because the graphite can give a large electrochemical equivalent and a high energy density.

Further, the anode material capable of absorbing/releasing lithium (Li) may include elemental lithium metal, metal elements and semimetal elements capable of forming alloys together with lithium (Li), alloys and compounds including such elements, and the like. In particular, the above materials are used together with the carbon material since in such case, good cycle characteristics as well as high energy density can be obtained. In addition to the alloys including two or more metal elements, the alloys used herein also include alloys including one or more metal elements and one or more semimetal elements. The alloy may be in the form of a solid solution, a eutectic crystal (eutectic mixture), an intermetallic compound, and a mixture thereof.

Examples of the metal elements and the semimetal elements may include tin (Sn), lead (Pb), aluminum (Al), indium (In), silicon (Si), zinc (Zn), antimony (Sb), bismuth (Bi), cadmium (Cd), magnesium (Mg), boron (B), gallium (Ga), germanium (Ge), arsenic (As), silver (Ag), zirconium (Zr), yttrium (Y) and hafnium (Hf). Examples of the above alloys and compounds may include a material having a chemical formula: $Ma_sMb_tLi_u$ and a material having a chemical formula: $Ma_pMc_qMd_r$. In these chemical formulae, Ma represents at least one of metal elements and semimetal elements capable of forming an alloy together with lithium; Mb represents at least one of metal elements and semimetal elements other than lithium and Ma; Mc represents at least one of the non-metal elements; Md represents at least one of metal elements and semimetal elements other than Ma; and s, t, u, p, q and r satisfy $s>0$, $t≥0$, $u≥0$, $p>0$, $q>0$ and $r≥0$.

In addition, an inorganic compound not including lithium (Li), such as $MnO_2$, $V_2O_5$, $V_6O_{13}$, NiS and MoS, may be used in the anode.

The above lithium-ion battery further includes an electrolyte, and the state of the electrolyte may be one or more of a gel state, a solid state and a liquid state. The liquid electrolyte includes a lithium salt and a non-aqueous solvent.

The lithium salt is one or more selected from $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, LiBOB and $LiPO_2F_2$. For example, the lithium salt is $LiPF_6$ because $LiPF_6$ can give a high ionic conductivity and improve the cycle performance.

The non-aqueous solvent may be a carbonate compound, a carboxylate compound, an ether compound, a nitrile compound, other organic solvents, or a combination thereof.

Examples of the carbonate compound are diethyl carbonate (DEC), dimethyl carbonate (DMC), dipropyl carbonate (DPC), methylpropyl carbonate (MPC), ethyl propyl carbonate (EPC), ethyl methyl carbonate (MEC), ethylene carbonate (EC), propylene carbonate (PC), butylene carbonate (BC), vinyl ethylene carbonate (VEC), fluoroethylene carbonate (FEC), 1,2-difluoroethylene carbonate, 1,1-difluoroethylene carbonate, 1,1,2-trifluoroethylene carbonate, 1,1,2,2-tetrafluoroethylene carbonate, 1-fluoro-2-methylethylene carbonate, 1-fluoro-1-methylethylene carbonate, 1,2-difluoro-1-methylethylene carbonate, 1,1,2-trifluoro-2-methylethylene carbonate, trifluoromethylethylene carbonate, and a combination thereof.

In some embodiments, based on the total weight of the electrolyte, the content of the carbonate compound is about 1 wt % or more. In some embodiments, the content of the carbonate compound is about 3 wt % or more. In some embodiments, the content of the carbonate compound is about 5 wt % or more. In some embodiments, the content of the carbonate compound is about 10 wt % or more. In some embodiments, the content of the carbonate compound is about 50 wt % or more. In some embodiments, the content of the carbonate compound is about 58 wt % or more. In some embodiments, the content of the carbonate compound is about 60 wt % or less. In some embodiments, the content of the carbonate compound is about 50 wt % or less. In some embodiments, the content of the cyclic carbonate compound is about 40 wt % or less. In some embodiments, the content of the carbonate compound is about 1 wt % to about 60 wt %. In some embodiments, the content of the carbonate compound is about 3 wt % to about 50 wt %.

Examples of the carboxylate compound are methyl acetate, ethyl acetate, n-propyl acetate, t-butyl acetate, methyl propionate, ethyl propionate, propyl propionate, γ-butyrolactone, decalactone, valerolactone, mevalonolactone, caprolactone and a combination thereof.

In some embodiments, based on the total weight of the electrolyte, the content of the carboxylate compound is about 1 wt % or more. In some embodiments, the content of the carboxylate compound is about 3 wt % or more. In some embodiments, the content of the carboxylate compound is about 5 wt % or more. In some embodiments, the content of the carboxylate compound is about 10 wt % or more. In some embodiments, the content of the carboxylate compound is about 60 wt % or less. In some embodiments, the content of the carboxylate compound is about 50 wt % or less. In some embodiments, the content of the carboxylate compound is about 40 wt % or less. In some embodiments, the content of the carboxylate compound is about 1 wt % to about 60 wt %. In some embodiments, the content of the carboxylate compound is about 3 wt % to about 50 wt %.

Examples of the ether compound are tetrahydrofuran, 2-methyltetrahydrofuran, 1,3-dioxolane, 2-methyl-1,3-dioxolane, 4-methyl-1,3-dioxolane, 1,3-dioxane, 1,4-dioxane, dimethoxypropane, dimethoxymethane, 1,1-dimethoxyethane, 1,2-dimethoxyethane, diethoxymethane, 1,1-diethoxyethane, 1,2-diethoxyethane, ethoxymethoxymethane, 1,1-ethoxymethoxyethane, 1,2-ethoxymethoxyethane, $HCF_2CF_2CH_2OCF_2CF_2H$, $(CF_3)_2CFCF(CF_2CF_3)(OCH_3)$, $CF_3CHFCF_2CH(CH_3)OCF_2CHFCF_3$, $HCF_2CF_2CH_2OCF_2CF_2CF_2CF_2H$, $HCF_2CF_2OCH_2CF_3$, $HCF_2CF_2OCH_2CH_2OCF_2CF_2H$, $HCF_2CF_2OCH_2CH_2CH_2OCF_2CF_2H$ and a combination thereof.

In some embodiments, based on the total weight of the electrolyte, the content of the ether compound is about 0.01 wt % or more. In some embodiments, the content of the ether compound is about 0.05 wt % or more. In some embodiments, the content of the ether compound is about 1 wt % or more. In some embodiments, the content of the ether compound is about 2 wt % or more. In some embodiments, the content of the ether compound is about 10 wt % or less. In some embodiments, the content of the ether compound is about 6 wt % or less. In some embodiments, the content of the ether compound is about 5 wt % or less. In some embodiments, the content of the ether compound is about 0.01 wt % to about 10 wt %. In some embodiments, the content of the ether compound is about 1 wt % to about 6 wt %.

The cathode material of the present application has a surface heterophasic structure, and has more grain boundary structures and rich oxygen structures on the surface thereof, thereby increasing the diversity of the electronic structure of the surface active site. Therefore, the cathode material can simultaneously be combined with various organic compounds, for example, an ether compound, to enhance the wettability of the surface with the electrolyte, thereby forming a more uniform interface and improving the overall interface stability of the electrode.

Examples of the nitrile compound are succinonitrile, glutaronitrile, adiponitrile, 1,5-dicyanopentane, 1,6-dicyanohexane, 1,7-dicyanoheptane, 1,8-dicyanooctane, 1,9-dicyanononane, 1,10-dicyanodecane, 1,12-dicyanododecane, tetramethylsuccinonitrile, 2-methylglutaronitrile, 2,4-dimethylglutaronitrile, 2,2,4,4-tetramethylglutaronitrile, 1,4-dicyanopentane, 1,4-dicyanopentane, 2,5-dimethyl-2,5-hexanedicarbonitrile, 2,6-dicyanoheptane, 2,7-dicyanooctane, 2,8-dicyanononane, 1,6-dicyanodecane, 1,2-dicyanobenzene, 1,3-dicyanobenzene, 1,4-dicyanobenzene, 3,5-dioxa-heptanedinitrile, 1,4-bis(cyanoethoxy)butane, ethylene glycol bis(2-cyanoethyl)ether, diethylene glycol bis(2-cyanoethyl)ether, triethylene glycol bis(2-cyanoethyl)ether, tetraethylene glycol bis(2-cyanoethyl)ether, 3,6,9,12,15,18-hexaoxaeicosanoic acid dinitrile, 1,3-bis(2-cyanoethoxy)propane, 1,4-bis(2-cyanoethoxy)butane, 1,5-bis(2-cyanoethoxy)pentane, ethylene glycol bis(4-cyanobutyl)ether, 1,3,5-pentanetricarbonitrile, 1,2,3-propanetricarbonitrile, 1,3,6-hexanetricarbonitrile, 1,2,6-hexanetricarbonitrile, 1,2,3-tris(2-cyanoethoxy)propane, 1,2,4-tris(2-cyanoethoxy)butane or a combination thereof.

In some embodiments, based on the total weight of the electrolyte, the content of the nitrile compound is about 0.01 wt % or more. In some embodiments, the content of the nitrile compound is about 0.05 wt % or more. In some embodiments, the content of the nitrile compound is about 1 wt % or more. In some embodiments, the content of the nitrile compound is about 2 wt % or more. In some embodiments, the content of the nitrile compound is about 10 wt % or less. In some embodiments, the content of the nitrile compound is about 6 wt % or less. In some embodiments, the content of the nitrile compound is about 5 wt % or less. In some embodiments, the content of the nitrile compound is about 0.01 wt % to about 10 wt %. In some embodiments, the content of the nitrile compound is about 1 wt % to about 6 wt %.

The cathode material of the present application has strong coordination ability with the nitrile, so that a protective film formed by the reaction of the nitrile compound at an initial stage of the cycle has higher stability and is less likely to be destroyed during the subsequent cycle.

Examples of other organic solvents are dimethyl sulfoxide, 1,3-propane sultone, sulfolane, methylsulfolane, 1,3-dimethyl-2-imidazolidinone, N-methyl-2-pyrrolidone, formamide, dimethylformamide, trimethyl phosphate, triethyl phosphate, trioctyl phosphate, tripropyl phosphate, and a combination thereof.

In some embodiments, a separator is provided between the cathode and the anode of the electrochemical device of the present application to prevent short circuit. The material and shape of the separator used in the electrochemical device of the present application are not particularly limited, and may be any of the techniques disclosed in the prior art. In some embodiments, the separator includes a polymer or an inorganic substance and the like formed by a material stable in the electrolyte of this application.

For example, the separator may include a substrate layer and a surface treatment layer. The substrate layer is a nonwoven fabric, a film or a composite film having a porous structure, and the material of the substrate layer is at least one selected from polyethylene, polypropylene, polyethylene terephthalate and polyimide. Specifically, a polypropylene porous membrane, a polyethylene porous membrane, polypropylene nonwoven cloth, polyethylene nonwoven cloth or a polypropylene-polyethylene-polypropylene porous composite membrane can be adopted.

At least one surface of the substrate layer is provided with the surface treatment layer, and the surface treatment layer may be a polymer layer or an inorganic substance layer, or may be a layer formed by mixing a polymer and an inorganic substance.

The inorganic substance layer includes inorganic particles and a binder, and the inorganic particles are selected from one or a combination of several of aluminum oxide, silicon oxide, magnesium oxide, titanium oxide, hafnium oxide, tin oxide, cerium oxide, nickel oxide, zinc oxide, calcium oxide, zirconium oxide, yttrium oxide, silicon carbide, boehmite, aluminum hydroxide, magnesium hydroxide, calcium hydroxide and barium sulfate. The binder is selected from one or a combination of several of polyvinylidene fluoride, a vinylidene fluoride-hexafluoropropylene copolymer, polyamide, polyacrylonitrile, polyacrylate, polyacrylic acid, polyacrylate, polyvinylpyrrolidone, polyvinyl ether, polymethyl methacrylate, polytetrafluoroethylene and polyhexafluoropropylene. The polymer layer includes a polymer, and the material of the polymer includes at least one of polyamide, polyacrylonitrile, acrylate polymer, polyacrylic acid, polyacrylate, polyvinylpyrrolidone, polyvinyl ether, polyvinylidene fluoride or poly(vinylidene fluoride-hexafluoropropylene).

The separator needs to be mechanically robust to withstand the stretching and piercing of the electrode material, and the pore size of the separator is typically less than 1 micron. Various separators including microporous polymer membranes, non-woven mats and inorganic membranes have been used in the lithium-ion batteries, wherein the polymer membranes based on microporous polyolefin materials are the most commonly used separators in combination with the electrolyte. The microporous polymer membranes can be made very thin (typically about 5 µm-25 µm) and highly porous (typically about 20%-50%) to reduce electrical resistance and increase ion conductivity. Meanwhile, the polymer membrane still has mechanical robustness. Those skilled in the art will appreciate that various separators widely used in the lithium-ion batteries are suitable for use in the present application.

Although the foregoing illustrates by taking the lithium-ion battery as an example, after reading the present application, those skilled in the art can conceive that the cathode material of the present application can be used for other suitable electrochemical devices. Such electrochemical devices include any device for electrochemical reaction, and specific examples thereof include all kinds of primary batteries, secondary batteries, fuel cells, solar cells or capacitors. In particular, the electrochemical device is a lithium secondary battery, including a lithium metal secondary battery, a lithium ion secondary battery, a lithium polymer secondary battery, or a lithium ion polymer secondary battery.

V. Application

The electrochemical device manufactured from the cathode material according to the present application is suitable for the electronic devices in various fields.

The use of the electrochemical device of the present application is not particularly limited and can be used for any use known in the prior art. In one embodiment, the electrochemical device of the present application can be used for, but is not limited to, notebook computers, pen input computers, mobile computers, e-book players, portable telephones, portable fax machines, portable copy machines, portable printers, headset stereo headphones, VCRs, LCD TVs, portable cleaners, portable CD players, mini disc players, transceivers, electronic notebooks, calculators, memory cards, portable recorders, radios, backup powers, motors, cars, motorcycles, power bicycles, bicycles, lighting fixtures, toys, game consoles, clocks, power tools, flashlights, cameras, large household batteries, lithium ion capacitors, and the like.

The lithium-ion battery is taken as an example and combined with specific embodiments of preparing the cathode material of the present application and testing methods for the electrochemical device for illustrating the benefits and advantages brought by the present application. However, those skilled in the art will appreciate that the preparation methods described in the present application are merely examples, and that any other suitable preparation method is within the scope of the present application.

VI. Embodiments

Preparation of Lithium-Ion Battery

The cathode materials in the embodiments and comparative examples were prepared into lithium-ion batteries by the following preparation method. Specifically, the cathode material prepared in the following embodiments and comparative examples, a conductive agent acetylene black and a binder polyvinylidene fluoride (PVDF) were sufficiently stirred and uniformly mixed in a weight ratio of 96:2:2 in N-methylpyrrolidone to form a cathode slurry, then the obtained cathode slurry was uniformly coated on the front and back surfaces of a cathode current collector aluminum foil and dried at 85° C. to obtain a cathode active material layer, and the cathode active material layer was subjected to cold pressing, slitting, slice cutting and welding of the cathode tab to obtain a cathode.

An anode active material artificial graphite, a conductive agent conductive acetylene black, a binder styrene-butadiene rubber (SBR) and a thickener carboxymethylcellulose sodium (CMC) were thoroughly stirred and uniformly mixed in a weight ratio of 96:1.5:1.5:1 in deionized water to form an anode slurry, the anode slurry was uniformly coated on the front and back surfaces of an anode current collector copper foil and dried at 85° C. to form an anode active material layer, and the anode active material layer was subjected to cold pressing, slitting, slice cutting and welding of the anode tab to obtain an anode.

A solution prepared from a lithium salt $LiPF_6$ and a non-aqueous organic solvent (ethylene carbonate (EC):diethyl carbonate (DEC):propylene carbonate (PC):propyl propionate (PP):vinylene carbonate (VC)=20:30:20:28:2, mass ratio) according to a mass ratio of 8:92 was used as an electrolyte of the lithium-ion battery.

The separator was made of a ceramic-coated polyethylene (PE) material separator.

The cathode, the separator, and the anode were stacked in order, so that the separator was between the cathode and anode for the function of isolation. The electrode assembly was placed in a package, the electrolyte was injected, packaging was performed, and then formation was performed to prepare the final lithium-ion battery.

Tests of Cathode Material

In the present application, the Raman test was used to characterize the material structure of the cathode material. The specific test conditions are as shown in Table 1 below:

TABLE 1

| Instrument Model | Detector | Objective Lens | Laser Wavelength | Grating | Power Attenuator |
|---|---|---|---|---|---|
| LabRAM HR Evol | Syncerity OE | x50_VIS_LWD | 532 nm | 300 (600 nm) | 1% |

| Confocal Pinhole | Exposure Time | Cumulative Number | Spectral Range |
|---|---|---|---|
| 199.981 | 10 s | 2 | 200-1000 $cm^{-1}$ or 400-800 $cm^{-1}$ |

Tests of Lithium-Ion Battery

The prepared lithium-ion batteries were tested as follows, and the test conditions were as follows.

(1) Cycle Test

Lithium-ion batteries (5 for each group) prepared by the cathode materials of the embodiments and comparative examples of the present application were repeatedly charged and discharged by the following steps, and the discharge capacity retention rate of the lithium-ion battery was calculated.

First, the lithium-ion battery was subjected to constant current charge at a temperature of 45° C. at a charge current of 1 C (i.e., the current value at which the theoretical capacity is completely discharged within 1 h) to an upper limit voltage of 4.4 V; and then, the lithium-ion battery was subjected to constant current discharge at a discharge current of 1 C to a cut-off voltage of 3.0 V, and the first discharge capacity was recorded. Subsequently, 200 charge and discharge cycles were performed, and the discharge capacity at the $200^{th}$ cycle was recorded.

Cycle capacity retention rate=(discharge capacity at $200^{th}$ cycle/discharge capacity at first cycle)×100%. The average value of the cycle capacity retention rate of each group of lithium-ion batteries was calculated.

(2) Thermal Stability Test

Lithium-ion batteries (5 for each group) prepared by the cathode materials of the embodiments and comparative examples of the present application were subjected to a thermal stability test by the following steps.

At normal temperature, the lithium ion-battery was subjected to constant current charge at a constant current of 1 C until an upper limit voltage of 4.4 V, and then the lithium-ion battery was subjected to constant voltage charge to 0.05 C at a constant voltage of 4.4 V to be in a fully charged state of 4.4 V. The thickness of the fully charged battery before storage was tested and recorded as $D_0$. The fully charged battery was placed in a 60° C. oven for 32 days. The thickness of the battery after storage was immediately tested and recorded as $D_1$.

The thickness expansion ratio of the battery before and after storage was calculated according to the following formula, $\varepsilon = (D_1 - D_0)/D_0 \times 100\%$.

The average value of the thickness expansion ratio of each group of lithium-ion batteries was calculated.

PREFERRED EMBODIMENT OF THE PRESENT APPLICATION

Specific embodiments of the cathode material provided by the present application will be described in detail below.

(1) Embodiments 1-9 and Comparative Examples 1-3

Embodiment 1

Lithium carbonate and tricobalt tetraoxide were blended at the molar ratio of lithium to cobalt of 1:1, and stirred in a ball mill mixer for 18 hours to a uniform state. The uniformly mixed material was placed in a refractory crucible, placed in a high-temperature furnace in an air atmosphere, and heated at a rate of 5° C./min; and after being kept at 750° C. for 24 hours, the material was cooled to normal temperature and taken out. Subsequently, the material taken out of the furnace was pulverized and sieved to obtain a cathode material having a surface heterophasic structure as described in Embodiment 1 of the present application.

Embodiments 2 and 3

The differences between Embodiments 2 and 3 and Embodiment 1 were only that: the sintering temperature was respectively adjusted to 850° C. and 1000° C., and other treatment processes and parameters were the same as those in Embodiment 1.

Embodiments 4-6

The differences between Embodiments 4-6 and Embodiment 2 were only that: the sintering time was respectively adjusted to 20 h, 28 h and 35 h, and other treatment processes and parameters were the same as those in Embodiment 2.

Embodiments 7-9

The differences between Embodiments 7-9 and Embodiment 2 were only that: the Li/Co molar ratio was respectively adjusted to 0.9, 0.95 and 1.05, and other treatment processes and parameters were the same as those in Embodiment 2.

Comparative Example 1

The differences between Comparative Example 1 and Embodiment 1 were that: the Li/Co molar ratio, sintering temperature and sintering duration were respectively adjusted to 1.08, 850° C. and 24 h, and other treatment processes and parameters were the same as in those Embodiment 1.

Comparative Example 2

The differences between Comparative Example 2 and Embodiment 1 were that: the Li/Co molar ratio, sintering temperature and sintering duration were respectively adjusted to 1.1, 950° C. and 18 h, and other treatment processes and parameters were the same as in those Embodiment 1.

Comparative Example 3

The differences between Comparative Example 3 and Embodiment 1 were that: the Li/Co molar ratio, sintering temperature and sintering duration were respectively adjusted to 1.08, 650° C. and 6 h, and other treatment processes and parameters were the same as in those Embodiment 1.

Taking the samples obtained in Embodiment 2 and Comparative Example 1 of the present application as examples, the present application performed tests as follows, and the test results were as follows.

Figure 2:
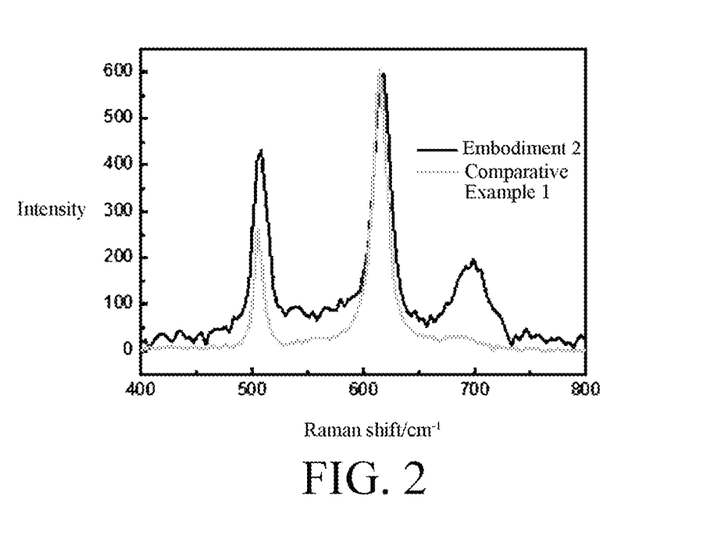
FIG. 2 is a Raman spectrum of cathode materials of Embodiment 2 and Comparative Example 1 of the present application.

FIG. 2 is a Raman spectrum of cathode materials of Embodiment 2 and Comparative Example 1 of the present application. As can be seen from FIG. 2, the cathode material obtained in Comparative Example 1 contained only the characteristic peak of lithium cobalt oxide and did not contain the characteristic peak of the oxide of cobalt. In view of this, it was found that the cathode material of Comparative Example 1 did not contain the oxide of cobalt.

Figure 3:
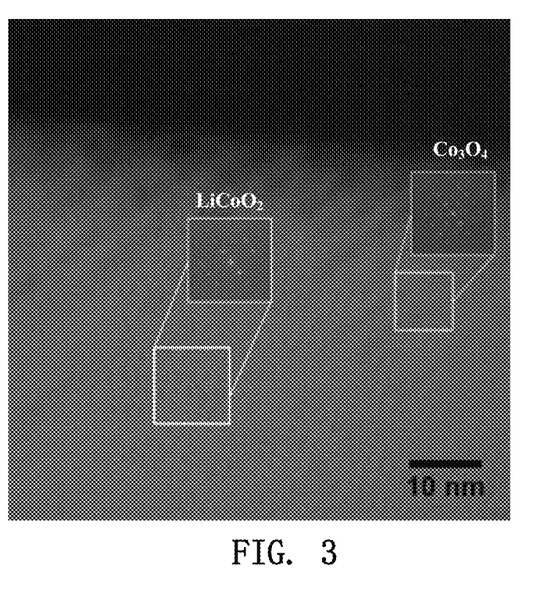
FIG. 3 is a transmission electron microscope (TEM) image of the cathode material of Embodiment 2 of the present application.

FIG. 3 is a TEM image of the cathode material obtained in Embodiment 2. As can be seen from FIG. 3, the surface layer of the cathode material simultaneously contained lithium cobaltate and tricobalt tetraoxide. In view of this, it was found that the cathode material of Embodiment 2 of the present application had a surface heterophasic structure.

Figure 4:
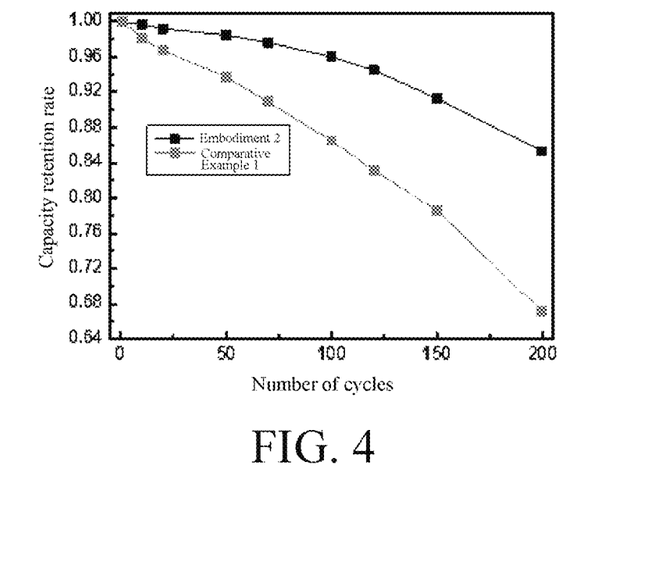
FIG. 4 is a graph showing cycle performance of lithium-ion batteries of Embodiment 2 and Comparative Example 1 at 45° C.

FIG. 4 is a graph showing cycle performance of lithium-ion batteries of Embodiment 2 and Comparative Example 1 at 45° C. As can be seen from FIG. 4, the cycle performance of the lithium-ion battery of Embodiment 2 of the present application was significantly better than the cycle performance of the lithium-ion battery of Comparative Example 1.

Figure 5:
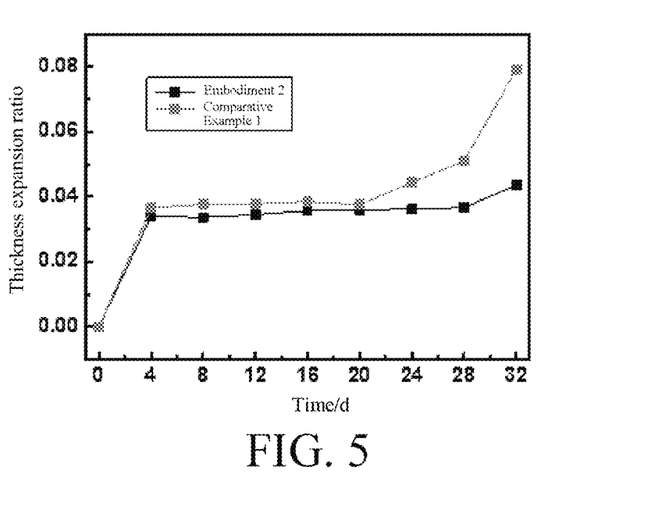
FIG. 5 shows thickness expansion ratios of the lithium-ion batteries of Embodiment 2 and Comparative Example 1 respectively stored in an oven at 60° C. for 4 days, 8 days, 12 days, 16 days, 20 days, 24 days, 28 days and 32 days.

FIG. 5 shows thickness expansion ratios of the lithium-ion batteries of Embodiment 2 and Comparative Example 1 respectively stored in an oven at 60° C. for 4 days, 8 days, 12 days, 16 days, 20 days, 24 days, 28 days and 32 days. As can be seen from FIG. 5, the stability of the cathode material of Embodiment 2 of the present application was significantly better than that of the cathode material of Comparative Example 1.

Besides, the implementation variables of Embodiments 1-9 and Comparative Examples 1-3, and the characteristic parameters and electrochemical data of the obtained samples are shown in Table 2:

As can be seen from Table 2 above, when the cathode materials of the embodiments and the comparative examples were applied to a lithium-ion battery, compared to the cathode materials of Comparative Examples 1-3 having no surface heterophasic structure, the cathode materials of Embodiments 1-9 having a surface heterophasic structure exhibited better structural stability and cycle stability.

(2) Embodiments 10-16 and Comparative Examples 4-6

Embodiment 10

The differences between Embodiment 10 and Embodiment 2 were only that: in the mixing stage, lithium carbonate and a tricobalt tetraoxide doped with 0.5% Al, 0.01% Mg and 0.01% F were mixed at the molar ratio of lithium to cobalt of 1:1, and other treatment processes and parameters were the same as those in Embodiment 2.

Embodiments 11 and 12

The differences between Embodiments 11 and 12 and Embodiment 10 were only that: the sintering temperature was respectively adjusted to 750° C. and 1000° C., and other treatment processes and parameters were the same as those in Embodiment 10.

Embodiments 13 and 14

The differences between Embodiments 13 and 14 and Embodiment 10 were only that: the sintering time was respectively adjusted to 20 h and 28 h, and other treatment processes and parameters were the same as those in Embodiment 10.

Embodiments 15 and 16

The differences between Embodiments 15 and 16 and Embodiment 10 were only that: the Li/Co molar ratio was respectively adjusted to 0.9 and 1.05, and other treatment processes and parameters were the same as those in Embodiment 10.

Comparative Example 4

The differences between Comparative Example 4 and Comparative Example 1 were only that: in the mixing stage,

TABLE 2

| | Raman Peak 1 Intensity $I_1$ | Raman Peak 2 Intensity $I_2$ | Raman Peak 3 Intensity $I_3$ | $I_1/I_2$ | $I_1/I_3$ | Li/Co Molar Ratio | Sintering Temperature | Sintering Time | Cycle Capacity Retention Rate | Average Expansion Ratio |
|---|---|---|---|---|---|---|---|---|---|---|
| Embodiment 1 | 174 | 468 | 633 | 0.372 | 0.275 | 1 | 750 | 24 | 77% | 5.42% |
| Embodiment 2 | 198 | 432 | 597 | 0.458 | 0.332 | 1 | 850 | 24 | 85% | 4.35% |
| Embodiment 3 | 241 | 409 | 559 | 0.589 | 0.431 | 1 | 1000 | 24 | 82% | 4.55% |
| Embodiment 4 | 202 | 512 | 522 | 0.395 | 0.387 | 1 | 850 | 20 | 84% | 4.37% |
| Embodiment 5 | 188 | 447 | 554 | 0.421 | 0.339 | 1 | 850 | 28 | 85% | 4.66% |
| Embodiment 6 | 201 | 411 | 532 | 0.489 | 0.378 | 1 | 850 | 35 | 79% | 5.62% |
| Embodiment 7 | 328 | 344 | 403 | 0.953 | 0.814 | 0.9 | 850 | 24 | 75% | 4.53% |
| Embodiment 8 | 278 | 376 | 369 | 0.739 | 0.753 | 0.95 | 850 | 24 | 82% | 4.71% |
| Embodiment 9 | 45 | 512 | 603 | 0.088 | 0.075 | 1.05 | 850 | 24 | 71% | 5.79% |
| Comparative Example 1 | 0 | 261 | 608 | 0 | 0 | 1.08 | 850 | 24 | 67% | 7.91% |
| Comparative Example 2 | 0 | 356 | 324 | 0 | 0 | 1.1 | 950 | 18 | 59% | 9.80% |
| Comparative Example 3 | 0 | 309 | 266 | 0 | 0 | 1.08 | 650 | 6 | 45% | 9.49% |

*Raman peak 1 refers to a characteristic peak in the range of 650 $cm^{-1}$ to 750 $cm^{-1}$; Raman peak 2 refers to a characteristic peak in the range of 470 $cm^{-1}$ to 530 $cm^{-1}$; Raman peak 3 refers to a characteristic peak in the range of 560 $cm^{-1}$ to 630 $cm^{-1}$, wherein Raman peak 1 is a characteristic peak of oxide of cobalt, and Raman peaks 2 and 3 are characteristic peaks of lithium cobalt oxide.

lithium carbonate and a tricobalt tetraoxide doped with 0.5% Al, 0.01% Mg and 0.01% F were mixed, and other treatment processes and parameters were the same as those in Comparative Example 1.

Comparative Example 5

The differences between Comparative Example 5 and Comparative Example 2 were only that: in the mixing stage, lithium carbonate and a tricobalt tetraoxide doped with 0.5% Al, 0.01% Mg and 0.01% F were mixed, and other treatment processes and parameters were the same as those in Comparative Example 2.

Comparative Example 6

The differences between Comparative Example 6 and Comparative Example 3 were only that: in the mixing stage, lithium carbonate and a tricobalt tetraoxide doped with 0.5% Al, 0.01% Mg and 0.01% F were mixed, and other treatment processes and parameters were the same as those in Comparative Example 3.

The implementation variables of Embodiments 10-16 and Comparative Examples 4-6, and the characteristic parameters and the electrochemical data of the obtained samples are shown in Table 3:

Embodiments 18 and 19

The differences between Embodiments 18 and 19 and Embodiment 17 were only that: the sintering temperature was respectively adjusted to 750° C. and 1000° C., and other treatment processes and parameters were the same as those in Embodiment 17.

Embodiments 20 and 21

The differences between Embodiments 20 and 21 and Embodiment 17 were only that: the sintering duration was respectively adjusted to 20 h and 28 h, and other treatment processes and parameters were the same as those in Embodiment 17.

Embodiments 22 and 23

The differences between Embodiments 22 and 23 and Embodiment 17 were only that: the Li/Co molar ratio was respectively adjusted to 0.9 and 1.05, and other treatment processes and parameters were the same as those in Embodiment 17.

Comparative Example 7

The differences between Comparative Example 7 and Comparative Example 4 were only that: the cathode material

TABLE 3

| | Raman Peak 1 Intensity $I_1$ | Raman Peak 2 Intensity $I_2$ | Raman Peak 2 Intensity $I_3$ | $I_1/I_2$ | $I_1/I_3$ | Li/Co Molar Ratio | Sintering Temperature | Sintering Time | Cycle Capacity Retention Rate | Average Expansion Ratio |
|---|---|---|---|---|---|---|---|---|---|---|
| Embodiment 10 | 197 | 422 | 600 | 0.467 | 0.328 | 1 | 850 | 24 | 92% | 3.45% |
| Embodiment 11 | 166 | 453 | 566 | 0.366 | 0.293 | 1 | 750 | 24 | 84% | 3.55% |
| Embodiment 12 | 175 | 418 | 574 | 0.419 | 0.305 | 1 | 1000 | 24 | 89% | 3.61% |
| Embodiment 13 | 183 | 404 | 562 | 0.453 | 0.326 | 1 | 850 | 20 | 88% | 3.70% |
| Embodiment 14 | 204 | 439 | 611 | 0.465 | 0.334 | 1 | 850 | 28 | 90% | 3.54% |
| Embodiment 15 | 233 | 411 | 592 | 0.567 | 0.394 | 0.9 | 850 | 24 | 86% | 3.81% |
| Embodiment 16 | 36 | 416 | 576 | 0.087 | 0.063 | 1.05 | 850 | 24 | 80% | 4.91% |
| Comparative Example 4 | 0 | 431 | 599 | 0 | 0 | 1.08 | 850 | 24 | 71% | 6.10% |
| Comparative Example 5 | 0 | 511 | 474 | 0 | 0 | 1.1 | 950 | 18 | 63% | 8.33% |
| Comparative Example 6 | 0 | 434 | 579 | 0 | 0 | 1.08 | 650 | 6 | 53% | 8.61% |

As can be seen from Table 3 above, when the doped cathode materials of the embodiments and the comparative examples were applied to a lithium-ion battery, compared to the cathode materials of Comparative Examples 4-6 having no surface heterophasic structure, the cathode materials of Embodiments 10-16 having a surface heterophasic structure exhibited better structural stability and cycle stability.

(3) Embodiments 17-23 and Comparative Examples 7-9

Embodiment 17

The differences between Embodiment 17 and Embodiment 10 were only that: the cathode material obtained in Embodiment 10 and $Al_2O_3$ were blended at the molar ratio of 1:0.001, and stirred in a ball mill mixer to a uniform state. The uniformly mixed material was placed in a refractory crucible, placed in a high-temperature furnace in an air atmosphere, and heated at a rate of 5° C./min; and after being kept at 600° C. for 10 hours, the material was cooled to normal temperature and taken out.

obtained in Comparative Example 4 and $Al_2O_3$ were blended at the molar ratio of 1:0.001, and stirred in a ball mill mixer to a uniform state. The uniformly mixed material was placed in a refractory crucible, placed in a high-temperature furnace in an air atmosphere, and heated at a rate of 5° C./min; and after being kept at 600° C. for 10 hours, the material was cooled to normal temperature and taken out.

Comparative Example 8

The differences between Comparative Example 8 and Comparative Example 5 were only that: the cathode material obtained in Comparative Example 5 and $Al_2O_3$ were blended at the molar ratio of 1:0.001, and stirred in a ball mill mixer to a uniform state. The uniformly mixed material was placed in a refractory crucible, placed in a high-temperature furnace in an air atmosphere, and heated at a rate of 5° C./min; and after being kept at 600° C. for 10 hours, the material was cooled to normal temperature and taken out.

Comparative Example 9

The differences between Comparative Example 9 and Comparative Example 6 were only that: the cathode material obtained in Comparative Example 6 and $Al_2O_3$ were blended at the molar ratio of 1:0.001, and stirred in a ball mill mixer to a uniform state. The uniformly mixed material was placed in a refractory crucible, placed in a high-temperature furnace in an air atmosphere, and heated at a rate of 5° C./min; and after being kept at 600° C. for 10 hours, the material was cooled to normal temperature and taken out.

The implementation variables of Embodiments 17-23 and Comparative Examples 7-9, and the characteristic parameters and the electrochemical data of the obtained samples are shown in Table 4:

TABLE 4

|  | Raman Peak 1 Intensity $I_1$ | Raman Peak 2 Intensity $I_2$ | Raman Peak 3 Intensity $I_3$ | $I_1/I_2$ | $I_1/I_3$ | Li/Co Molar Ratio | Sintering Temperature | Sintering Time | Cycle Capacity Retention Rate | Average Expansion Ratio |
|---|---|---|---|---|---|---|---|---|---|---|
| Embodiment 17 | 192 | 432 | 580 | 0.444 | 0.331 | 1 | 850 | 24 | 95% | 3.40% |
| Embodiment 18 | 170 | 433 | 524 | 0.393 | 0.324 | 1 | 750 | 24 | 86% | 3.49% |
| Embodiment 19 | 204 | 417 | 549 | 0.489 | 0.372 | 1 | 1000 | 24 | 91% | 3.50% |
| Embodiment 20 | 189 | 439 | 467 | 0.431 | 0.405 | 1 | 850 | 20 | 88% | 3.42% |
| Embodiment 21 | 211 | 451 | 423 | 0.468 | 0.499 | 1 | 850 | 28 | 89% | 3.41% |
| Embodiment 22 | 277 | 381 | 371 | 0.727 | 0.747 | 0.9 | 850 | 24 | 84% | 4.60% |
| Embodiment 23 | 33 | 374 | 454 | 0.088 | 0.073 | 1.05 | 850 | 24 | 81% | 4.88% |
| Comparative Example 7 | 0 | 223 | 412 | 0 | 0 | 1.08 | 650 | 6 | 71% | 5.99% |
| Comparative Example 8 | 0 | 345 | 542 | 0 | 0 | 1.1 | 950 | 18 | 64% | 7.95% |
| Comparative Example 9 | 0 | 411 | 559 | 0 | 0 | 1.08 | 850 | 24 | 56% | 7.89% |

As can be seen from Table 4 above, when the doped and coated cathode materials of the embodiments and the comparative examples were applied to a lithium-ion battery, compared to the cathode materials of Comparative Examples 7-9 having no surface heterophasic structure, the cathode materials of Embodiments 17-23 having a surface heterophasic structure exhibited better structural stability and cycle stability.

References to "some embodiments," "part of embodiments," "one embodiment," "another example," "example," "specific example" or "part of examples" in the whole specification mean that at least one embodiment or example in the present application comprises specific features, structures, materials or characteristics described in the embodiments or examples. Thus, the descriptions appear throughout the specification, such as "in some embodiments," "in an embodiment," "in one embodiment," "in another example," "in one example," "in a specific example" or "an example," which does not necessarily refer to the same embodiment or example in the present application. Furthermore, the specific features, structures, materials or characteristics in the descriptions can be combined in any suitable manner in one or more embodiments or examples.

Although the illustrative embodiments have been shown and described, it should be understood by those skilled in the art that the above embodiments cannot be interpreted as limiting the present application, and the embodiments can be changed, substituted and modified without departing from the spirit, principle and scope of the present application.

What is claimed is:
1. A cathode material, comprising:
a lithium cobalt oxide; and
an oxide of cobalt;
wherein a Raman spectrum of the cathode material has characteristic peaks in the range of about 470 $cm^{-1}$ to about 530 $cm^{-1}$, about 560 $cm^{-1}$ to about 630 $cm^{-1}$ and about 650 $cm^{-1}$ to about 750 $cm^{-1}$, and
wherein the cathode material has a surface heterophasic structure, and the surface heterophasic structure comprises the lithium cobalt oxide and the oxide of cobalt,
wherein the peak intensity at the characteristic peak of about 650 $cm^{-1}$ to about 750 $cm^{-1}$ in the Raman spectrum of the cathode material is $I_1$, the peak intensity at the characteristic peak of about 560 $cm^{-1}$ to about 630 $cm^{-1}$ is $I_3$, wherein about $0.1 \leq I_1/I_3 \leq$ about 0.6,
wherein the cathode material comprises an element M, wherein the element M comprises one or more selected from the group consisting of Al, Mg, Ca, Zn, Ti, Zr, Nb, Mo, La, Y, Ce, Ni, Mn, W and Ho, and
wherein a molecular formula of the cathode material is $Li_xCo_{1-a}O_{2-b} \cdot yCoO \cdot zCo_2O_3 \cdot M_aG_b$, wherein $0.8 \leq x \leq 1.05$, $0 < y \leq z < 0.2$, $0 \leq a \leq 0.01$, and $0 \leq b \leq 0.01$, and wherein the element G comprises one or more selected from the group consisting of F, S, B, N and P.

2. The cathode material according to claim 1, wherein a depth of the surface heterophasic structure from a surface to an interior of the cathode material is D nm, wherein the range of D is about $0 < D \leq$ about 300.

3. The cathode material according to claim 1, wherein the oxide of cobalt comprises one or more of the following: $Co_3O_4$, $Co_2O_3$ or CoO.

4. The cathode material according to claim 1, wherein the peak intensity at the characteristic peak of about 470 $cm^{-1}$ to about 530 $cm^{-1}$ is $I_2$, wherein about $0 < I_1/I_2 \leq$ about 1.

5. A cathode, comprising a cathode material, wherein the cathode material comprises:
a lithium cobalt oxide; and
an oxide of cobalt;
wherein a Raman spectrum of the cathode material has characteristic peaks in the range of about 470 $cm^{-1}$ to about 530 $cm^{-1}$, about 560 $cm^{-1}$ to about 630 $cm^{-1}$ and about 650 $cm^{-1}$ to about 750 $cm^{-1}$, and
wherein the cathode material has a surface heterophasic structure, and the surface heterophasic structure comprises the lithium cobalt oxide and the oxide of cobalt,
wherein the peak intensity at the characteristic peak of about 650 $cm^{-1}$ to about 750 $cm^{-1}$ in the Raman spectrum of the cathode material is $I_1$, the peak intensity at the characteristic peak of about 560 $cm^{-1}$ to about 630 $cm^{-1}$ is $I_3$, wherein about $0.1 \leq I_1/I_3 \leq$ about 0.6, wherein the cathode material comprises an element M, wherein the element M comprises one or more selected from the group consisting of Al, Mg, Ca, Zn, Ti, Zr, Nb, Mo, La, Y, Ce, Ni, Mn, W and Ho, and wherein a molecular formula of the cathode material is $Li_xCo_{1-a}O_{2-b} \cdot yCoO \cdot zCo_2O_3 \cdot M_aG_b$, wherein $0.8 \leq x \leq 1.05$, $0 < y \leq z < 0.2$, $0 \leq a \leq 0.01$, and $0 \leq b \leq 0.01$, wherein the element G comprises one or more selected from the group consisting of F, S, B, N and P.

6. The cathode according to claim 5, wherein a depth of the surface heterophasic structure from a surface to an interior of the cathode material is D nm, wherein the range of D is about $0 < D \leq $ about 300.

7. The cathode according to claim 5, wherein the oxide of cobalt comprises one or more of the following: $Co_3O_4$, $Co_2O_3$ or CoO.

8. The cathode according to claim 5, wherein the peak intensity at the characteristic peak of about 470 cm$^{-1}$ to about 530 cm$^{-1}$ is $I_2$, about $0 < I_1/I_2 \leq $ about 1.

9. The cathode according to claim 5, wherein a Raman spectrum of the cathode has characteristic peaks in the range of about 470 cm$^{-1}$ to about 530 cm$^{-1}$, about 560 cm$^{-1}$ to about 630 cm$^{-1}$ and about 650 cm$^{-1}$ to about 750 cm$^{-1}$.

10. An electrochemical device, comprising an anode, a separator, an electrolyte and a cathode comprising a cathode material, wherein the cathode material comprises:
   a lithium cobalt oxide; and
   an oxide of cobalt;
   wherein a Raman spectrum of the cathode material has characteristic peaks in the range of about 470 cm$^{-1}$ to about 530 cm$^{-1}$, about 560 cm$^{-1}$ to about 630 cm$^{-1}$ and about 650 cm$^{-1}$ to about 750 cm$^{-1}$, and wherein the cathode material has a surface heterophasic structure, and the surface heterophasic structure comprises the lithium cobalt oxide and the oxide of cobalt, wherein the peak intensity at the characteristic peak of about 650 cm$^{-1}$ to about 750 cm$^{-1}$ in the Raman spectrum of the cathode material is $I_1$, the peak intensity at the characteristic peak of about 560 cm$^{-1}$ to about 630 cm$^{-1}$ is $I_3$, wherein about $0.1 \leq I_1/I_3 \leq $ about 0.6, wherein the cathode material comprises an element M, wherein the element M comprises one or more selected from the group consisting of Al, Mg, Ca, Zn, Ti, Zr, Nb, Mo, La, Y, Ce, Ni, Mn, W and Ho, and wherein a molecular formula of the cathode material is $Li_xCo_{1-a}O_{2-b} \cdot yCoO \cdot zCo_2O_3 \cdot M_aG_b$, wherein $0.8 \leq x \leq 1.05$, $0 < y \leq z < 0.2$, $0 \leq a \leq 0.01$, and $0 \leq b \leq 0.01$, wherein the element G comprises one or more selected from the group consisting of F, S, B, N and P.

11. The electrochemical device according to claim 10, wherein a depth of the surface heterophasic structure from a surface to an interior of the cathode material is D nm, wherein the range of D is about $0 < D \leq $ about 300.

12. The electrochemical device according to claim 10, wherein the oxide of cobalt comprises one or more of the following: $Co_3O_4$, $Co_2O_3$ or CoO.

13. The electrochemical device according to claim 10, wherein the peak intensity at the characteristic peak of about 470 cm$^{-1}$ to about 530 cm$^{-1}$ is $I_2$, about $0 < I_1/I_2 \leq $ about 1.

14. The electrochemical device according to claim 10, wherein a Raman spectrum of the cathode has characteristic peaks in the range of about 470 cm$^{-1}$ to about 530 cm$^{-1}$, about 560 cm$^{-1}$ to about 630 cm$^{-1}$ and about 650 cm$^{-1}$ to about 750 cm$^{-1}$.

* * * * *